US011521428B1

(12) United States Patent
Filatov et al.

(10) Patent No.: US 11,521,428 B1
(45) Date of Patent: Dec. 6, 2022

(54) METHODS AND SYSTEMS FOR SIGNATURE VERIFICATION

(71) Applicant: Parascript LLC, Longmont, CO (US)

(72) Inventors: Alexander Filatov, Longmont, CO (US); Ivan Bulatov, Longmont, CO (US); Ilia Semenovich Lossev, Boulder, CO (US); Tatiana Vazioulina, Boulder, CO (US)

(73) Assignee: Parascript LLC, Longmont, CO (US)

( * ) Notice: Subject to any disclaimer, the term of this patent is extended or adjusted under 35 U.S.C. 154(b) by 0 days.

(21) Appl. No.: 17/724,322

(22) Filed: Apr. 19, 2022

Related U.S. Application Data

(60) Provisional application No. 63/316,922, filed on Mar. 4, 2022.

(51) Int. Cl.
*G06V 40/30* (2022.01)
*G06V 10/82* (2022.01)

(52) U.S. Cl.
CPC ............ *G06V 40/382* (2022.01); *G06V 10/82* (2022.01); *G06V 40/394* (2022.01)

(58) Field of Classification Search
CPC ..... G06V 40/382; G06V 10/82; G06V 40/394
See application file for complete search history.

(56) References Cited

U.S. PATENT DOCUMENTS

| | | | | |
|---|---|---|---|---|
| 2008/0114678 | A1* | 5/2008 | Bennett | G06Q 20/407 705/44 |
| 2009/0175491 | A1* | 7/2009 | Charpentier | G06V 30/1444 707/999.104 |
| 2012/0212459 | A1* | 8/2012 | Rusu | G06V 40/30 345/179 |
| 2015/0341370 | A1* | 11/2015 | Khan | H04L 63/20 726/30 |
| 2016/0210453 | A1* | 7/2016 | Seo | G06F 3/04883 |
| 2018/0212947 | A1* | 7/2018 | Chen | H04W 12/06 |
| 2018/0349677 | A1* | 12/2018 | Khan | G06V 40/376 |
| 2018/0351756 | A1* | 12/2018 | Dave | H04N 21/4788 |
| 2019/0065822 | A1* | 2/2019 | Hong | G06F 3/0488 |
| 2019/0121846 | A1* | 4/2019 | Kim | G06F 21/32 |
| 2019/0267123 | A1* | 8/2019 | Stueckemann | G06Q 30/06 |

OTHER PUBLICATIONS

"Handwriting Trajectory Recovery using End-to-End Deep Encoder-Decoder Network", Ayan Kumar Bhunia et al., ICPR 2018, 6 pages.
(Continued)

*Primary Examiner* — Ming Y Hon
(74) *Attorney, Agent, or Firm* — Merchant and Gould P.C.

(57) ABSTRACT

A method and system of signature verification that includes receiving a signature-in-question, extracting at least one of an image of the signature-in-question and a trajectory of the signature-in-question from the received signature-in-question, accessing a reference signature, extracting at least one of a reference image and a reference trajectory from the accessed reference signature, comparing the at least one of the image of the signature-in-question and trajectory of the signature-in-question to the at least one of the reference image and reference trajectory, and determining whether signature-in-question is authentic based on the comparison.

28 Claims, 12 Drawing Sheets

(56) References Cited

OTHER PUBLICATIONS

"Automatic Trajectory Extraction and Validation of Scanned Handwritten Characters", Ralph Niels and Louis Vuurpijl, Oct. 2006, 6 pages.
"State-of-the-Art in Handwritten Signature Verification System", Rania A. Mohammed, et al., International Conference on Computational Science and Computational Intelligence, 2015, 7 pages.
"SigNet: Convolutional Siamese Network for Writers Independent Offline Signature Verification", Sounak Dey et al., Pattern Recognition letters, Sep. 30, 2017, 7 pages.

* cited by examiner

METHODS AND SYSTEMS FOR SIGNATURE VERIFICATION

PRIORITY

This application claims the benefit of U.S. Provisional Application No. 63/316,922, filed on Mar. 4, 2022, and titled "Methods and Systems for Signature Verification," the entire contents of which are herein incorporated by reference.

BACKGROUND

Signature verification is a technique used by various entities such as, e.g., banks, to validate the identity of an individual. Signature verification may be used to compare signatures in bank offices with signatures captured in bank branches. An image of a signature, or an actual signature of, e.g., a bank customer, may be visually inspected or instead fed into signature verification software to be compared to the signature image on file in the bank office. Signature verification software is a type of software that compares signatures and checks whether one of the signatures is authentic. This saves time and energy, helps decrease human error during the signature verification process, and lowers chances of signature fraud.

SUMMARY

In one aspect, the technology relates to a method of signature verification that includes receiving a signature-in-question, extracting at least one of an image and a trajectory of the signature-in-question, accessing a reference signature file of a reference signature, the reference signature file including at least one of a reference image and a reference trajectory, extracting at least one of the reference image and the reference trajectory from the accessed reference signature file, comparing the at least one of the image and trajectory of the signature-in-question to the at least one of the reference image and reference trajectory, and determining whether the signature-in-question is authentic based on the comparison.

In an example of the above aspect, the trajectory of the signature-in-question and the reference trajectory respectively comprise trajectory features including at least one of a sequence of coordinates representing locations of a writing member, a time stamp corresponding to each location, a pressure applied by the writing member, and a tilt of the writing member.

In yet another example of the above aspect, the writing member is one of a stylus, a pen, and a finger of the person, and the tilt of the writing member includes an altitude and an azimuth of the writing member. In an example, at least one of a signing velocity, a signing acceleration, a signing pressure, and a signature time are derived from the trajectory of the signature-in-question and the reference trajectory, respectively.

In further examples of the above aspect, receiving the signature-in-question includes at least one of capturing the signature-in-question on a signing device, receiving a photograph of the signature-in-question, and receiving a scan of the signature-in-question; the signing device includes one of a signature pad and a signature screen; and receiving the signature-in-question includes receiving the signature-in-question at a kiosk, the kiosk including at least one of a video camera, a photo camera, a scanner, and a signature pad.

In other examples of the above aspect, accessing the reference signature file includes accessing at least one of a scan of the reference signature and a photograph of the reference signature; accessing the reference signature file may also include accessing the reference signature file from a data repository; accessing the reference signature file from the data repository may include accessing the reference signature file over a network; and extracting the reference trajectory includes extracting the reference trajectory from the memory.

In yet another example of the above aspect, the image of the signature-in-question is received with the signature-in-question, the extracted reference trajectory is converted to the reference image, and the image of the signature-in-question and the reference image are compared to determine whether the signature-in-question is authentic.

In a further example of the above aspect, the trajectory of the signature-in-question is received with the signature-in-question, the trajectory of the signature-in-question is converted to the image of the signature-in-question, and the image of the signature-in-question and the reference image are compared to determine whether the signature-in-question is authentic.

In another example of the above aspect, the trajectory of the signature-in-question is received with the signature-in-question, and the trajectory of the signature-in-question and the reference trajectory are compared to determine whether the signature-in-question is authentic.

In a further example of the above aspect, comparing the trajectory of the signature-in-question and the reference trajectory results in at least one score; determining that the signature-in-question is a forgery when the at least one score is below a first threshold; and determining that a signing person is impaired when the at least one score is below a second threshold.

In another example of the above aspect, the image of the signature-in-question is received with the signature-in-question, the image of the signature-in-question is converted to the trajectory of the signature-in-question, and the trajectory of the signature-in-question and the reference trajectory are compared to determine whether the signature-in-question is authentic.

In a further example of the above aspect, the image of the signature-in-question is received with the signature-in-question, and the image of the signature-in-question and the reference trajectory are compared to determine whether the signature-in-question is authentic. For example, comparing the image of the signature-in-question and the reference trajectory includes inputting the image of the signature-in-question in a first neural network and generating a first output; converting the reference trajectory to a reference image and inputting the reference image in a second neural network to generate a second output; inputting the reference trajectory in a third neural network and generating a third output; concatenating the first input, the second input and the third input; inputting the concatenated first, second and third outputs into a classification neural network; and generating at least one score. As another example, at least one of the first output, the second output and the third output is a vector.

In other examples of the above aspect, comparing the image of the signature-in-question and the reference trajectory includes inputting the image of the signature-in-question in a first neural network and generating a first output; inputting the reference trajectory in a second neural network and generating a second output; and inputting the first output and the second output in a third neural network and generating at least one score.

In another example of the above aspect, the trajectory of the signature-in-question is received with the signature-in-question, and the trajectory of the signature-in-question and the reference image are compared to determine whether the signature-in-question is authentic. For example, comparing the trajectory of the signature-in-question and the reference image includes inputting the trajectory of the signature-in-question in a first neural network and generating a first output, inputting the reference image in a second neural network and generating a second output, inputting the trajectory of the signature-in-question in a third neural network and generating a third output, concatenating the first output, the second output and the third output, inputting the concatenated first, second and third outputs into a classification neural network, and generating at least one score.

In another aspect, the technology relates to a signature verification system that includes a data receiver, an updatable data repository functionally coupled to the data receiver, a display device functionally coupled to the data receiver, a processor operatively coupled to the data receiver, to the updatable data repository and to the display device, and a memory coupled to the processor, the memory storing instructions. The instructions, when executed by the processor, perform a set of operations including receiving, at the data receiver, a signature-in-question, extracting, via the processor, at least one of an image of the signature-in-question and a trajectory of the signature-in-question from the received signature-in-question, accessing a reference signature file of a reference signature, the reference signature file including at least one of a reference image and a reference trajectory, extracting, via the processor, at least one of a reference image and a reference trajectory from the accessed reference signature, comparing, via the processor, the at least one of the image of the signature-in-question and trajectory of the signature-in-question to the at least one of the reference image and reference trajectory; and determining whether the signature-in-question is authentic based on the comparison.

DETAILED DESCRIPTION

Determining whether a signature is authentic poses many challenges, particularly if the determination is to be performed in real time. One challenge is that authentic signatures made by the same person may have some degree of variability. Another challenge is that the degree of variability between authentic signatures may vary from person to person. Yet another challenge is that forgers imitate signatures to attempt to obtain money, goods and/or services, and in the case of good forgeries, it may be difficult with the naked eye to determine whether a signature is authentic or a forgery. Thus, the ability to improve the accuracy of a verification process in real time may be advantageous. Accordingly, there is a need to reliably and accurately verify a signature to determine whether the signature provided is authentic or whether it is a forgery. Another advantage may be to reliably and accurately verify the signature in real time.

Accordingly, there is a technical problem that arises out of the fact that signature verification, e.g., in real time, is time consuming and inefficient A solution to this technical problem may include receiving a signature-in-question from a person, extracting at least one of an image of the signature-in-question and a trajectory of the signature-in-question from the received signature-in-question, accessing a reference signature, extracting at least one of a reference image and a reference trajectory from the accessed reference signature, comparing the at least one of the image of the signature-in-question and trajectory of the signature-in-question to the at least one of the reference image and reference trajectory, and determining whether the signature-in-question is authentic based on the comparison.

Another solution to the problem is to rely on neural networks, which are collections of weighted functions where the output of one weighted function or layer is the input in another weighted function or layer. In the case of a Siamese neural network, the neural subnetworks of the Siamese neural network have shared weights. The neural networks may be trained on known data sets of signatures, and trained neural networks can then be used on unknown data sets of signatures. For example, the neural networks may be trained on a number of known signatures, as well as on a number of known forgeries, so that when an unknown signature is presented, it may be possible to determine with a degree of confidence whether the unknown signature is in fact authentic or a forgery.

Figure 1:
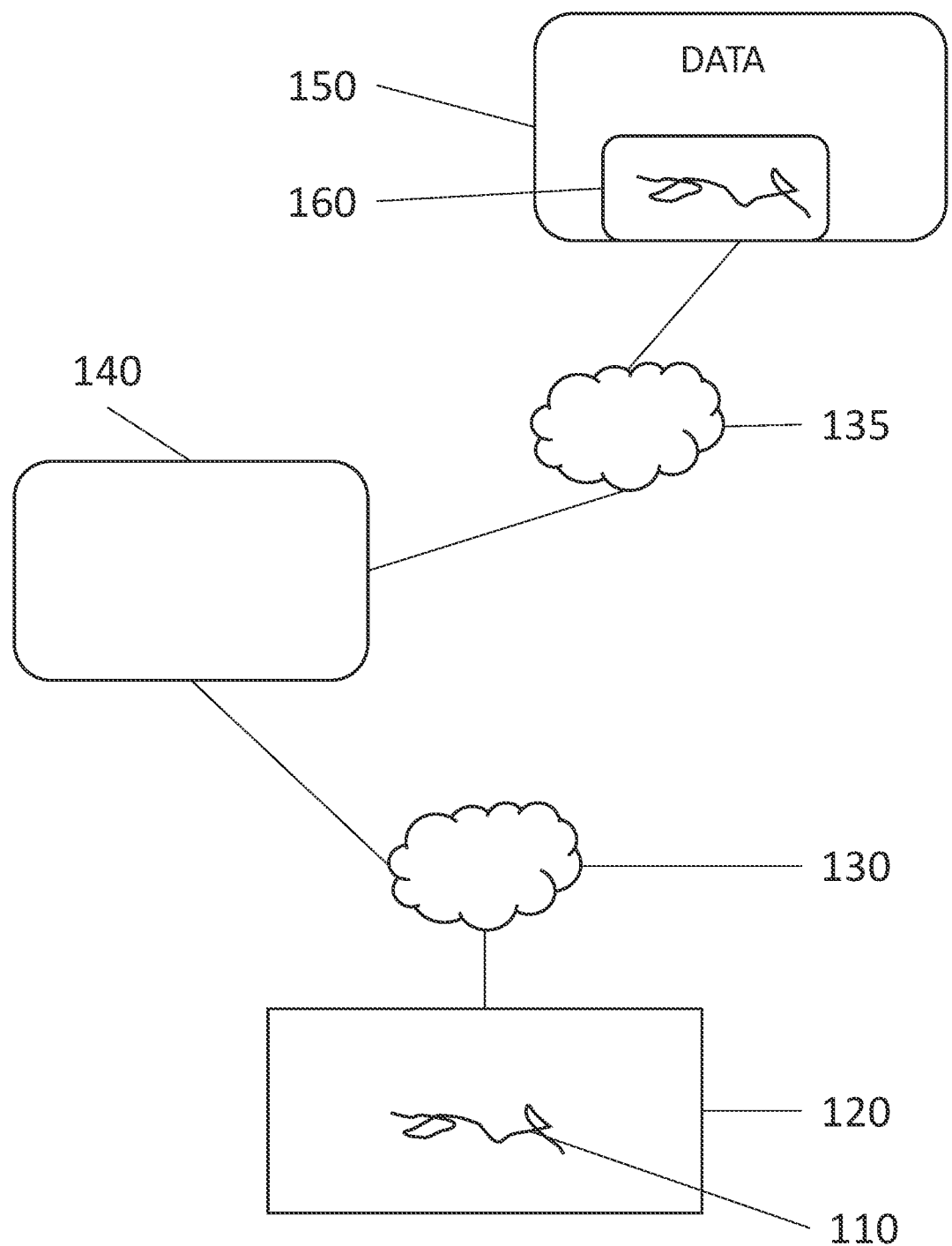
FIG. 1 is a diagram illustrating a system of signature verification, in accordance with various aspects.

FIG. 1 is a diagram illustrating a method and system of signature verification, in accordance with various aspects. In FIG. 1, a signature 110 may be entered at a signing device 120, for example by a person (not shown). In various aspects, the signature 110 may be entered via, e.g., a pen, a stylus, other writing member, a finger of the person, or other method of entering a handwritten signature. In another example, the signature 110 may be entered as an image such as, e.g., an image of an already existing signature on a photo ID document. Alternatively, several ID documents may be used to provide a signature. The signature 110 may also be entered in the form of a photograph or a scan. For example, an ID document may be provided in the form of a scan, and from the scan of the ID document, an image of the signature 110 may be extracted. In an example, the signature 110 may be entered on a signature receiving device 120 such as a signature pad or signature screen or display such as, e.g., a handheld device, smartphone or tablet. The signature receiving device 120 may also be a kiosk including a signature receiving surface, a video camera, a photo camera and/or a scanning device.

In various examples, the signature receiving device 120 may be connected to a requesting entity 140 via a connection such as, e.g., a network 130. For example, the network 130 may be the internet, a local area network, a wide area network, a land line, a wireless network, or the like. In various aspects, the requesting entity 140 may be, e.g., a bank or credit card company, a title company, or other organization requesting verification of the authenticity of a signature provided at the signature receiving device 120. In operation, the requesting entity 140 requests signature 110 for verification, and obtains the signature 110, entered on the signature receiving device 120, over the network 130. The requesting entity 140 is connected to a data repository 150 via a connection, e.g., over a network 135. For example, the network 135 may be the internet, a local area network, a wide area network, a land line, a wireless network, or the like. When the requesting entity 140 receives the signature 110, the requesting entity 140 may access data repository 150. Upon accessing the data repository 150, the requesting entity 140 may access a reference signature 160 from the data repository 150. In various examples, the data repository 150 may be, e.g., a government institution or the Department of Motor Vehicles (DMV), and the requesting entity 140 may obtain, from the data repository 150, a reference signature 160 from the person alleged to have signed the signature 110. Accordingly, both the signature 110 and the reference signature 160 may be compared to determine whether the signature 110 is sufficiently similar to the reference signature 160 to conclude that the signature 110 is authentic, e.g., the signature 110 has been signed by the same person who signed the reference signature 160. Determining whether the signatures 110 and 160 are from the same person is discussed in greater detail below.

Figure 2:
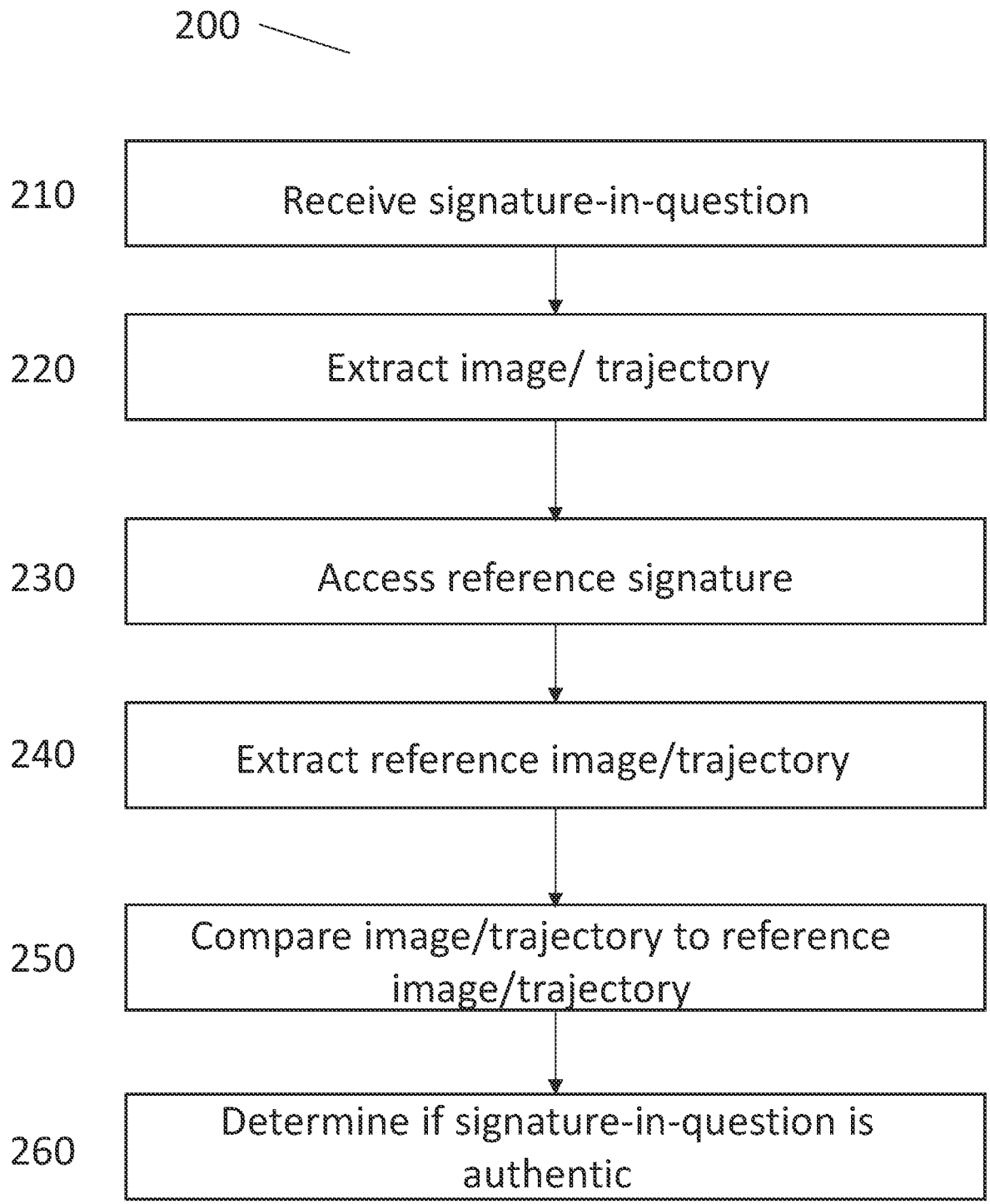
FIG. 2 is a flowchart describing a method of signature verification, in accordance with various aspects.

FIG. 2 is a flowchart describing a method of signature verification, in accordance with various aspects. For the sole purpose of convenience, method 200 is described through use of at least the example system 700 described below. However, it is appreciated that the method 200 may be performed by any suitable system.

Operation 210 includes receiving a signature-in-question, e.g., from a person. For example, the person may be applying for a loan, for employment, or for any other service, and may be submitting their signature for verification. In various aspects, receiving the signature-in-question may be performed via, e.g., capturing the signature-in-question on a signing device by the person physically writing their signature using a writing implement such as a pen, a pencil, a stylus, and the like, receiving a photograph of the signature-in-question, receiving a scan of the signature-in-question, receiving a drawing in place of the signature, or receiving a word or password in place of the signature. The signing device may be a signature pad or a signature screen such as, e.g., the screen of a tablet, computer or smartphone. In other examples, receiving the signature-in-question can be performed at a kiosk, where the kiosk may have a video camera, a photo camera, a scanner, a signature pad, or a signature screen such as the signature screen discussed above. For example, the signature may be signature 110, and the signature pad may be similar to the receiving device 120, these elements being discussed above with respect to FIG. 1. In various aspects, the signature-in-question may be received a plurality of times by the same person.

Operation 220 includes extracting an image of the signature-in-question and/or a trajectory of the signature-in-question from the received signature-in-question. For example, the trajectory of the signature-in-question may have trajectory features which may include a sequence of coordinates representing locations of a writing member on, e.g., the signature pad or screen, a time stamp corresponding to each location of the writing member, a pressure applied by the person via writing member, and/or a tilt of the writing member. In various aspects, the writing member may be a stylus, a pen, a pencil, and/or the finger of the person providing the signature. In various aspects, for example, several additional features may be computed form the trajectory of the signature-in-question, these features including, e.g., a signing velocity, a signing acceleration, a signing pressure, a signature time of the signature-in-question, and/or the tilt of the writing member which includes an altitude and/or an azimuth of the writing member, as further discussed below in FIG. 6.

Operation 230 includes accessing a reference signature file of a reference signature, the reference signature file including a reference image and/or a reference trajectory. In various aspects, the reference signature may have been previously provided by the person and kept as a reference for authenticating later-provided signatures. In other aspects, more than one reference signature may be stored. For example, any previously provided and approved signature may be stored. In an example, the previously provided signature may also be a drawing in place of the signature, or a word or password in place of the signature. In an aspect, accessing the reference signature file may be performed by accessing a scan of the reference signature or a photograph of the reference signature that is stored in a data repository as the signature file. The reference signature may be accessed from a data repository such as, e.g., a government agency such as the DMV, and the like, an employer database, or another type of database or data repository. For example, the data repository may be similar to data repository 150 discussed above with respect to FIG. 1. The reference signature may also be accessed from the data repository over a network such as, an internet connection, a wireless connection, a WAN or a LAN. For example, the network may be any one of networks 130 and 135 discussed above with respect to FIG. 1, and the government agency such as DMV and the like, employer database or other type of database may be similar to the requesting entity 140 discussed above with respect to FIG. 1. The reference signature may also be accessed on the same device as the device receiving the signature-in-question, or may be accessed in a memory that is directly connected to the device receiving the signature-in-question. In other examples, when an image of an ID document is received as a reference signature, the image of the signature itself may be extracted from the image of the ID document, and it is the extracted image of the signature that is accessed during operation 230.

Operation 240 includes extracting a reference image and/or a reference trajectory from the accessed reference signature file. In various aspects, the reference signature file is stored in a memory, or the reference signature may be encoded in the memory, for example as metadata, and extracting the reference image/trajectory includes obtaining the reference image/trajectory from the memory or the metadata. As another example, the reference signature file may be an ID document, ID card or other card such as, e.g., a credit card, the ID card or document may include a chip or magnetic strip on which the reference image and/or the reference trajectory may be encoded or stored.

Operation 250 includes comparing the image and/or the trajectory of the signature-in-question to the reference image and/or the reference trajectory. In an example of operation 250, the image of the signature-in-question is received with the signature-in-question, upon accessing the reference signature, the reference trajectory is extracted from the accessed reference signature file, the extracted reference trajectory is converted to a reference image, and the image of the signature-in-question and the converted reference image are compared to determine, during operation 260, whether the signature-in-question is authentic. Because the comparison in this aspect is between two images, the first and reference image may be compared using image comparison techniques. This step is discussed in greater detail in the flowcharts of FIGS. 3A-3B. In various aspects, the signature pad includes a memory and a processor, and the comparison during operation 250 may be performed at the processor of the signature pad. Accordingly, privacy may be preserved for a person providing the signature.

Figure 3A:
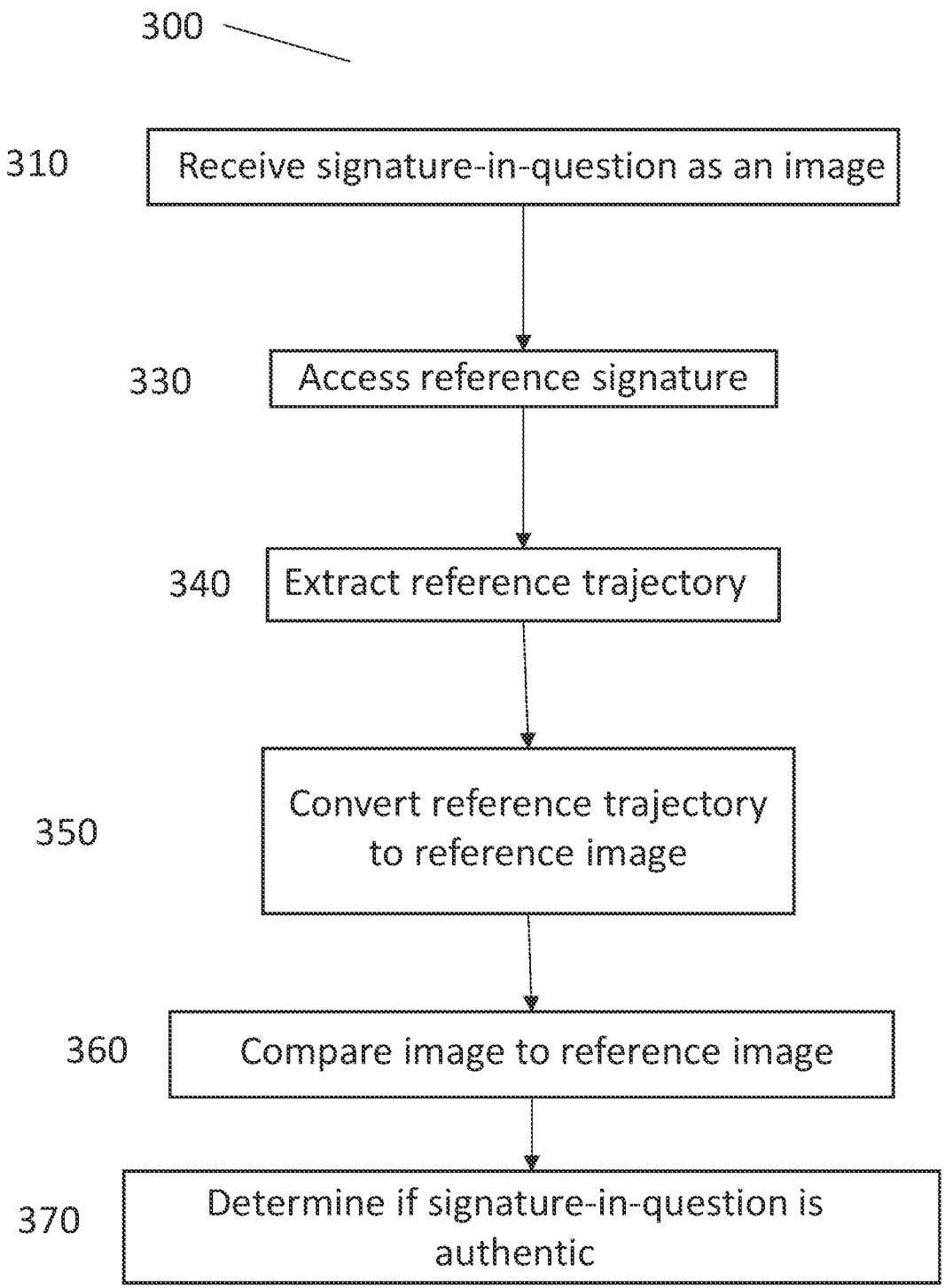
FIGS. 3A-3B are flowcharts describing comparing an image of the signature-in-question with the reference trajectory, in accordance with various aspects.
Figure 3B:
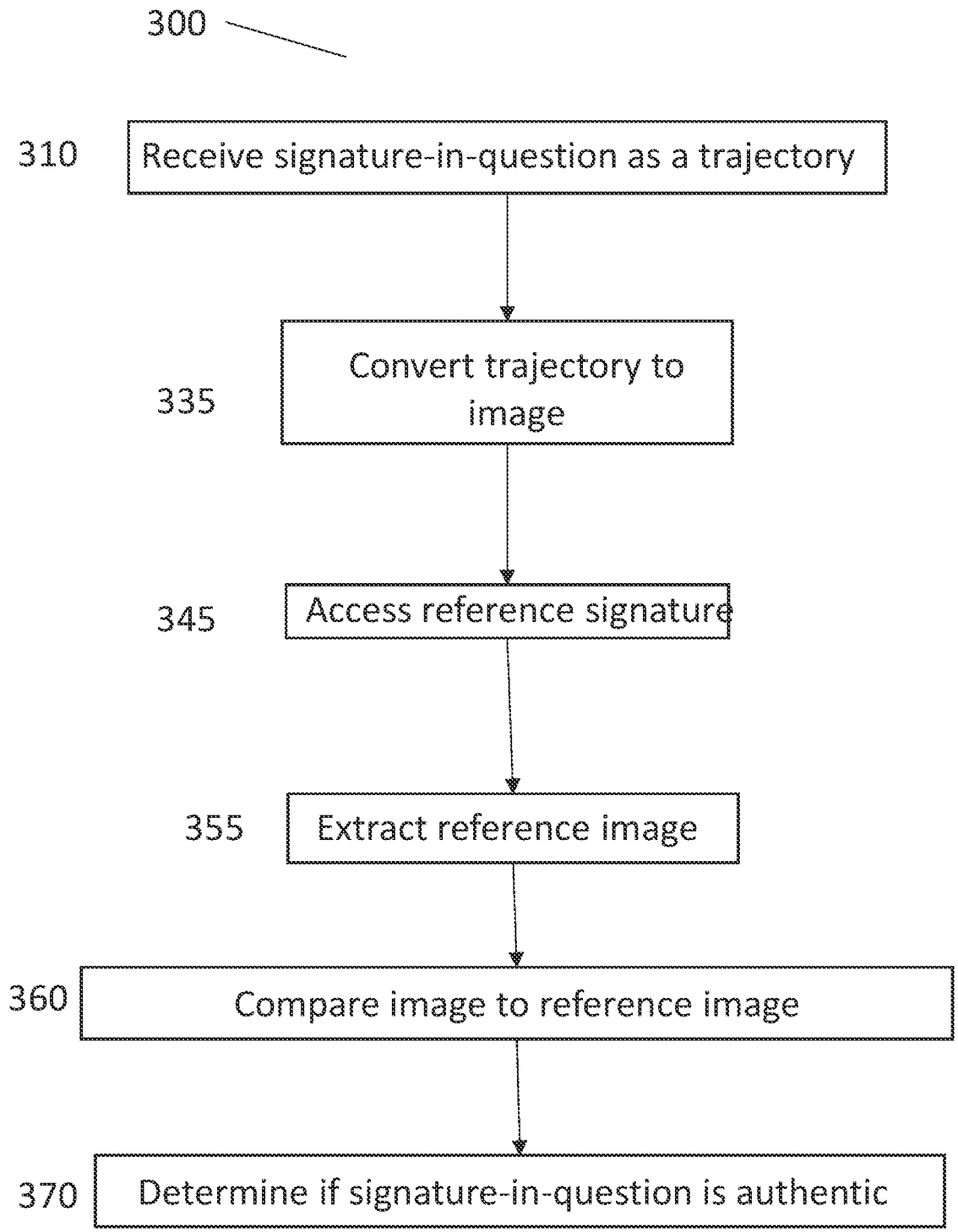

FIGS. 3A-3B are flowcharts describing a method 300 of comparing an image of the signature-in-question with the reference trajectory, in accordance with various aspects. In FIG. 3A, in operation 310, a signature-in-question is received. This operation is similar to operation 210 discussed above with respect to FIG. 2 and is not discussed further. In various aspects, the signature-in-question may be received a plurality of times by the same person. During operation 310, the signature-in-question is received as an image. During operation 330, the reference signature file is accessed. This operation is similar to operation 230 discussed above with respect to FIG. 2 and is not discussed further. Upon accessing the reference signature file, the reference trajectory is extracted from the accessed reference signature file during operation 340. The extracted reference trajectory may then be converted, during operation 350, to a reference image, and during operation 360, the received image of the signature-in-question is compared to the reference image. When the image of the signature-in-question and the reference image are compared to each other, then during operation 370, a determination is made whether the signature-in-question is authentic. This operation is similar to operation 260 discussed above with respect to FIG. 2.

In another example of operation 250 in FIG. 2, the trajectory of the signature-in-question is received with the signature-in-question, the trajectory of the signature-in-question is converted to the image of the signature-in-question. Upon accessing the reference signature file, the reference image is extracted from the accessed reference signature, and the image of the signature-in-question and the reference image are compared to determine whether the signature-in-question is authentic at operation 260. Because the comparison in this aspect is between two images, the image of the signature-in-question and the reference image may be compared using image comparison techniques. This step is also discussed in greater detail in the flowchart of FIG. 3.

In FIG. 3B, method 300 includes operation 310 where a signature-in-question is received as a trajectory. During operation 335, the trajectory of the signature-in-question is converted to an image of the signature-in-question. During operation 345, the reference signature file is accessed. This operation is similar to operation 330 discussed above. Upon accessing the reference signature file, the reference image is extracted from the accessed reference signature file during operation 355. During operation 360, the image of the signature-in-question is compared to the reference image. When the image of the signature-in-question and the reference image are compared to each other, then during operation 370, a determination is made whether the signature-in-question is authentic. This operation is similar to operation 260 discussed above with respect to FIG. 2.

In yet another example of operation 250 from the flowchart of FIG. 2, the trajectory of the signature-in-question is received with the signature-in-question, upon accessing the reference signature file, the reference trajectory is extracted from the accessed reference signature file, and the trajectory of the signature-in-question and the reference trajectory are compared to determine whether the signature-in-question is authentic at operation 260. In an example, comparing the trajectory of the signature-in-question and the reference trajectory results in a score. For example, the score may be indicative of various outcomes such as, e.g., whether the signature-in-question is a forgery, whether the signature-in-question is authentic, or whether the person was impaired at the time of producing the signature. The term "impaired" here means that the person may be cognitively impaired, under some type of influence, suffering from an ailment or disease, or may be aging to the point of producing an altered signature. Accordingly, the score may allow the determination of whether the signature-in-question is a forgery when the score is below a first threshold, whether the person is impaired when the at score is below a second threshold, or whether the signature-in-question is authentic and the person is not impaired when the score is above both the first and second thresholds, at operation 260. This operation is discussed in greater detail in the flowcharts of FIGS. 4A and 4B below.

In a further example of operation 250, the image of the signature-in-question is received with the signature-in-question, the image of the signature-in-question is converted to the trajectory of the signature-in-question, the reference trajectory is extracted from the accessed reference signature file, and the trajectory of the signature-in-question and the reference trajectory are compared to determine whether the signature-in-question is authentic at operation 260. In various aspects, each of the trajectory of the signature-in-question and the reference trajectory include a plurality of trajectory features, and during operation 250, the trajectory features of each of the trajectory of the signature-in-question and the reference trajectory are compared to each other individually or as a group. Alternatively, the trajectory of the signature-in-question and the reference trajectory are compared by inputting both trajectories in separate neural networks and analyzing the result. Details of converting an image to a trajectory are taught in "Handwriting Trajectory Recovery using End-to-End Deep Encoder-Decoder Network" (Ayan Kumar Bhunia et al.; ICPR 2018) and "Automatic Trajectory Extraction and Validation of Scanned Handwritten Characters" (Ralph Niels and Louis Vuurpijl; October 2006), which are incorporated herein by reference in their entirety. Details of the use of how to compare the trajectory of the signature-in-question and the reference trajectory are further explained in "State-of-the-Art in Handwritten Signature Verification System" (Rania A. Mohammed et al.; International Conference on Computational Science and Computational Intelligence; 2015), which is incorporated herein by reference in its entirety. This operation is also discussed in greater detail in the flowchart of FIGS. 4A and 4B.

Figure 4A:
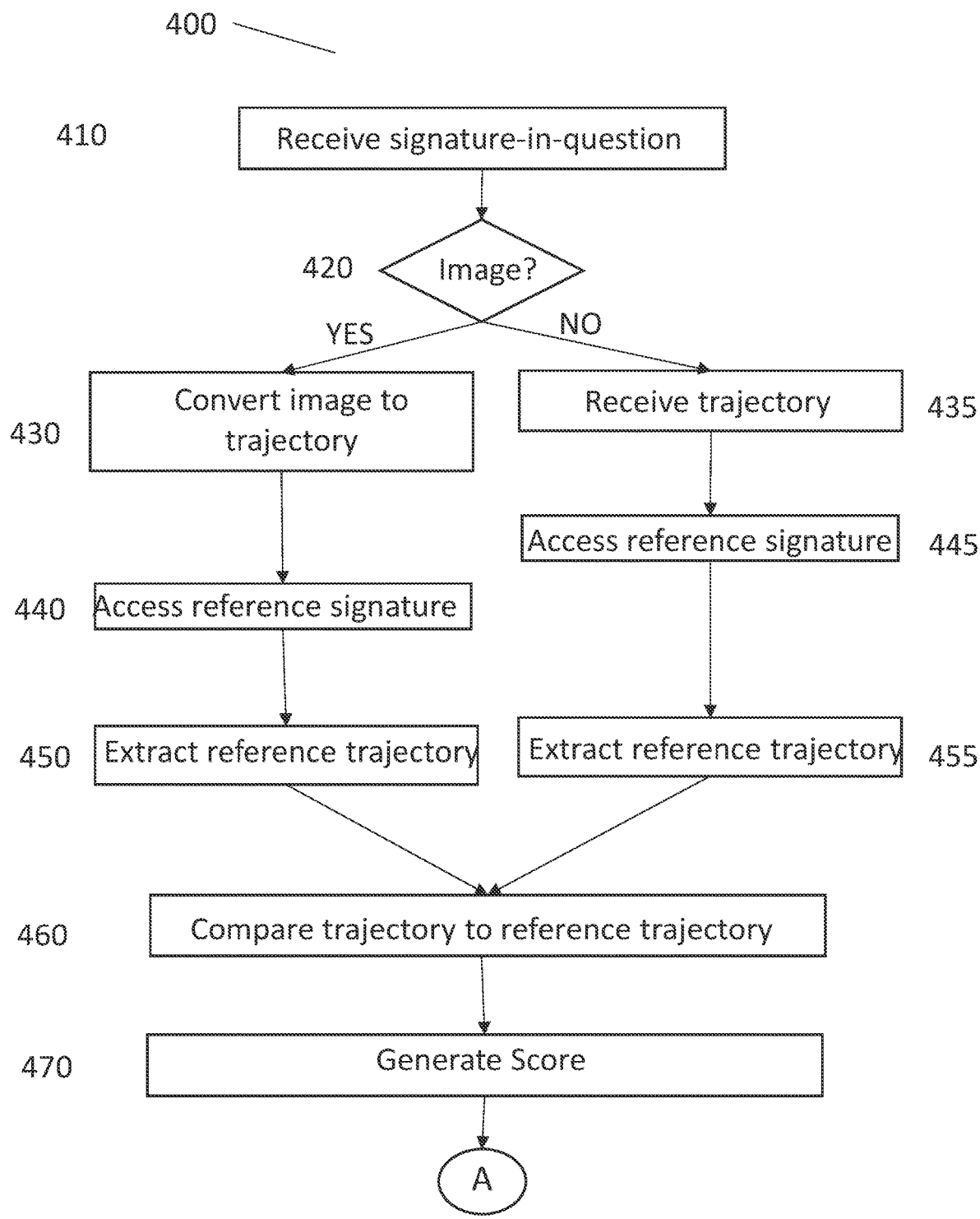
FIGS. 4A and 4B are flowcharts describing comparing the trajectory of the signature-in-question with the reference trajectory, in accordance with various aspects.
Figure 4B:
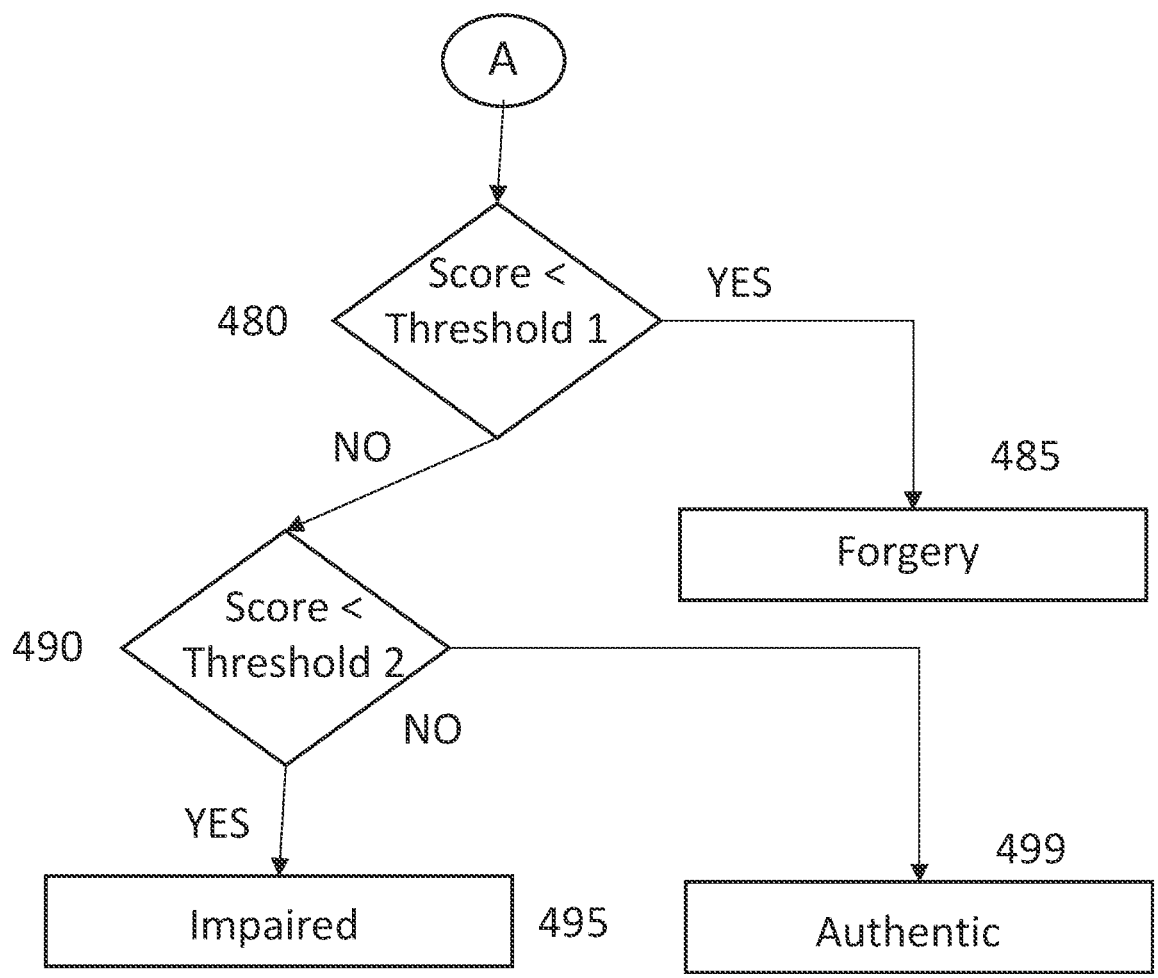

FIGS. 4A and 4B are flowcharts describing a method 400 of comparing the trajectory of the signature-in-question with the reference trajectory, in accordance with various aspects. In FIG. 4A, the signature-in-question is received at operation 410. In various aspects, operation 420 determines whether the signature-in-question is received as an image or as a trajectory. At operation 435, the signature-in-question is received as a trajectory of the signature-in-question. At operation 445, the reference signature file is accessed, the reference signature file including a reference trajectory stored or encoded therein, and at operation 455, the reference trajectory is extracted from the accessed reference signature file. During operation 460, the trajectory of the signature-in-question and the reference trajectory are compared to determine whether the signature-in-question is authentic. In various aspects, each of the trajectory of the signature-in-question and the reference trajectory include a plurality of trajectory features, and during operation 460, the trajectory features of each of the trajectory of the signature-in-question and the reference trajectory are compared to each other individually or as a group. Alternatively, the trajectory of the signature-in-question and the reference trajectory are compared by inputting both trajectories in separate neural networks and analyzing the result. Details of the use of how to compare the trajectory of the signature-in-question and the reference trajectory are further explained in "State-of-the-Art in Handwritten Signature Verification System" (Rania A. Mohammed et al.; International Conference on Computational Science and Computational Intelligence; 2015), which is incorporated herein by reference in its entirety. In an example, based on the comparison between the trajectory of the signature-in-question and the reference trajectory during operation 460, a score is generated at operation 470.

Alternatively, as also illustrated in the flow chart of FIG. 4A, when the signature-in-question is received at operation 410 and operation 420 determines that the signature-in-question is received as an image, at operation 430, the image of the signature-in-question is converted to the trajectory of the signature-in-question. During operation 440, the reference signature file is accessed, and during operation 450, the reference trajectory is extracted from the accessed reference signature file. During operation 460, the trajectory of the signature-in-question and the reference trajectory are compared, and based on the comparison between the trajectory of the signature-in-question and the reference trajectory during operation 460, a score is generated at operation 470. Once the score is generated at operation 470, the method 400 continues to operations 480-499 to analyze the generated score.

FIG. 4B is a flowchart describing additional steps of the method 400, in accordance with various aspects. In FIG. 4B, for example, the score generated during operation 470 may be indicative of various outcomes such as, e.g., whether the signature-in-question is a forgery, whether the signature-in-question is authentic but the person is impaired at the time of producing the signature, or whether the signature-in-question is authentic and the person is not impaired. For example, if the score is below a first threshold, as determined during operation 480, then it may be concluded at operation 485 that the signature-in-question is a forgery. In an example, if the score is equal to or above the first threshold, as determined in operation 480, the score may be compared to a second threshold during operation 490. During operation 490, if the score is lower than the second threshold, the second threshold being higher than the first threshold, then it may be determined at operation 495 that the signature-in-question is authentic but the person is impaired. In other aspects, if the score is equal to or higher than the second threshold, as determined during operation 490, then it may be determined during operation 499 that the signature-in-question is authentic and that the person producing the signature-in-question is not impaired. Accordingly, the score generated during operation 470 may allow the determination of whether the signature-in-question is authentic, whether the person who produced the signature is impaired, or whether the signature-in-question is a forgery. In various aspects, if the score is determined to be inconclusive or too low, then operations 410 through 499 may be repeated more than once until a conclusion as to the authenticity of the signature-in-question may be assessed.

In another example of operation of the flow chart of FIG. 2, operations 210-240 are as discussed above, and comparing the image of the signature-in-question and the reference trajectory during operation 250 may be performed by inputting the image of the signature-in-question in a first neural network and generating a first output, converting the reference trajectory to a reference image and inputting the reference image in a second neural network and generating a second output. The first and second output may be two vectors of the same dimensionality. The comparison also includes inputting one or more trajectory features of the reference trajectory in a third neural network and generating a third output, the third output being, e.g., a vector of a predetermined dimension. The comparison also includes concatenating the first output, the second output and the third output, and inputting the concatenated outputs into a classification neural network, for example a perceptron, to generate at least one score representing a degree of confidence that a given pair of signatures belong to the same person.

In various aspects, the neural networks may be trained jointly on data sets where the reference signature and the signature-in-question are produced by the same person, and data sets where the reference signature and the signature-in-question are produced by different persons. For example, the first and second neural networks may be subnetworks of a Siamese neural network. Details of the use of the neural networks to compare image and image are further explained in "SigNet: Convolutional Siamese Network for Writer Independent Offline Signature Verification" (Sounak Dey et al.; Pattern Recognition letters, 30 Sep. 2017), which is incorporated herein by reference in its entirety. This operation is discussed in greater detail in the flowcharts of FIGS. 5A-5D below.

In another example of operation 250, comparing the image of the signature-in-question and the reference trajectory may be performed by inputting the image of the signature-in-question in a first neural network and generating a first output in the form of a first vector, inputting the reference trajectory in a second neural network and generating a second output in the form of a second vector, and inputting the first output and the second output in a third neural network that compares the first vector and the second vector to generate at least one score as a result. In various aspects, the three neural networks may be jointly trained on data set that consist of cases where the reference signature and the signature-in-question belong to the same person, and of cases where the reference signature and the signature-in-question belong to different persons. For example, the first two neural networks may be trained to perform signature comparison and generate embedding vectors, and the third neural network may be trained to compare embedding vectors and generate a score indicative of a degree of confidence that the signatures are from the same person or from different persons. This operation is also discussed in greater detail in the flowcharts of FIGS. 5A-5D below.

Figure 5A:
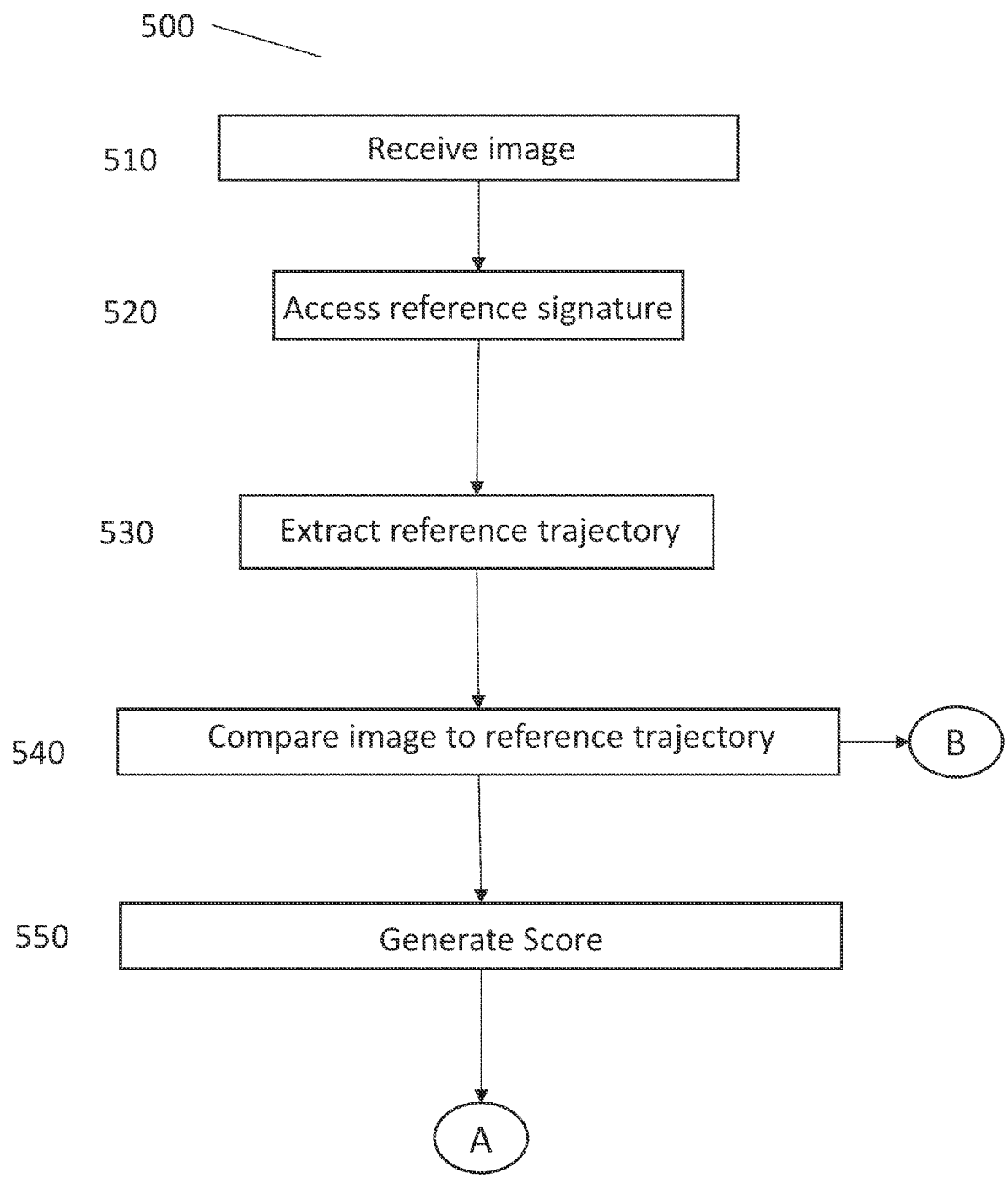
FIGS. 5A-5D are flowcharts describing comparing the trajectory of the signature-in-question with the reference trajectory, in accordance with various aspects.

FIGS. 5A-5D are flowcharts describing comparing the image of the signature-in-question with the reference trajectory, in accordance with various aspects. In FIG. 5A, the image of the signature-in-question is received with the signature-in-question during operation 510. During operation 520, the reference signature file is accessed, and during operation 530, the reference trajectory is extracted from the accessed reference signature file. During operation 540, the image of the signature-in-question is compared to the reference trajectory, as further described in FIG. 5B, in accordance with various aspects. Based on the comparison performed during operation 540, a score is generated during operation 550.

Figure 5B:
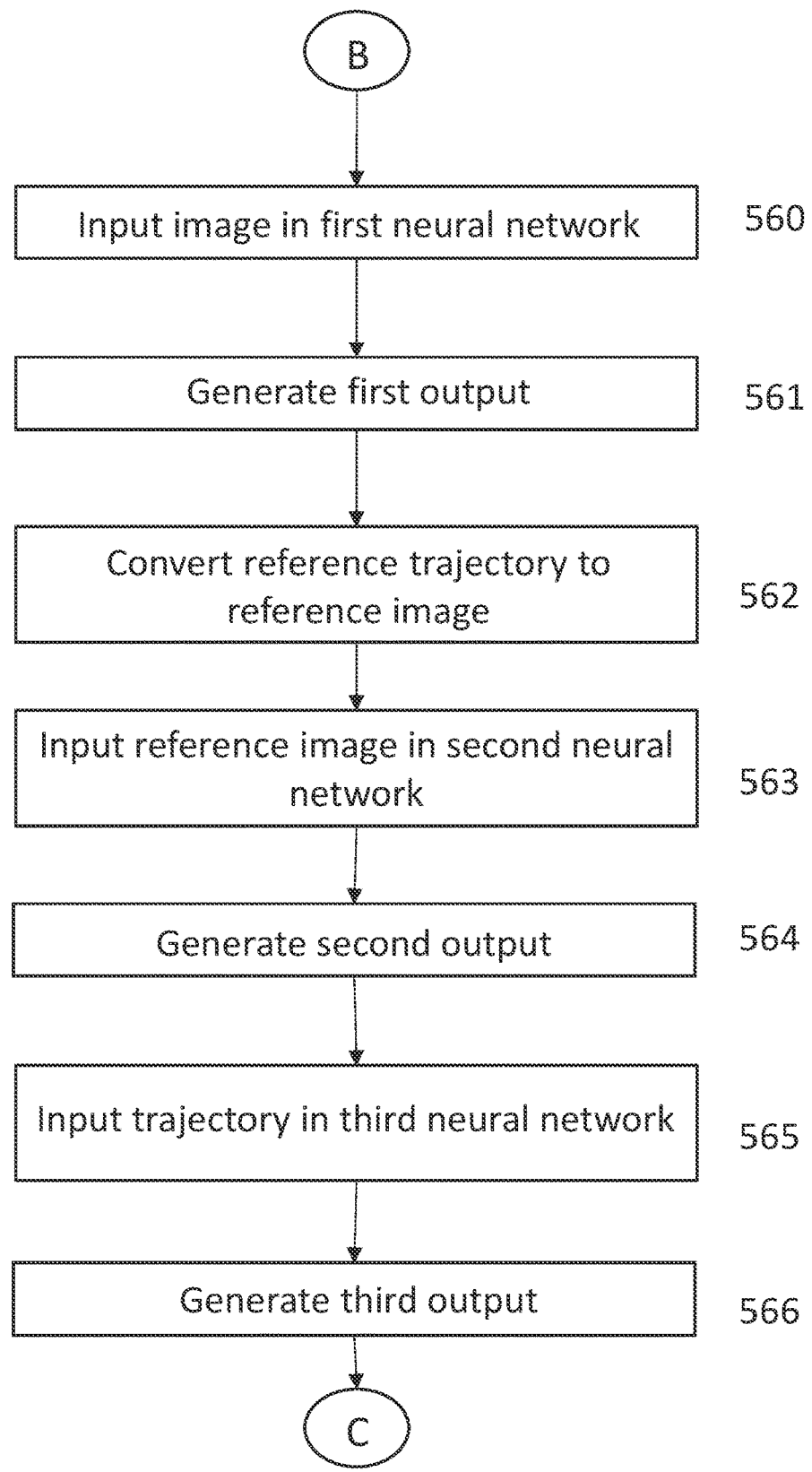
Figure 5C:
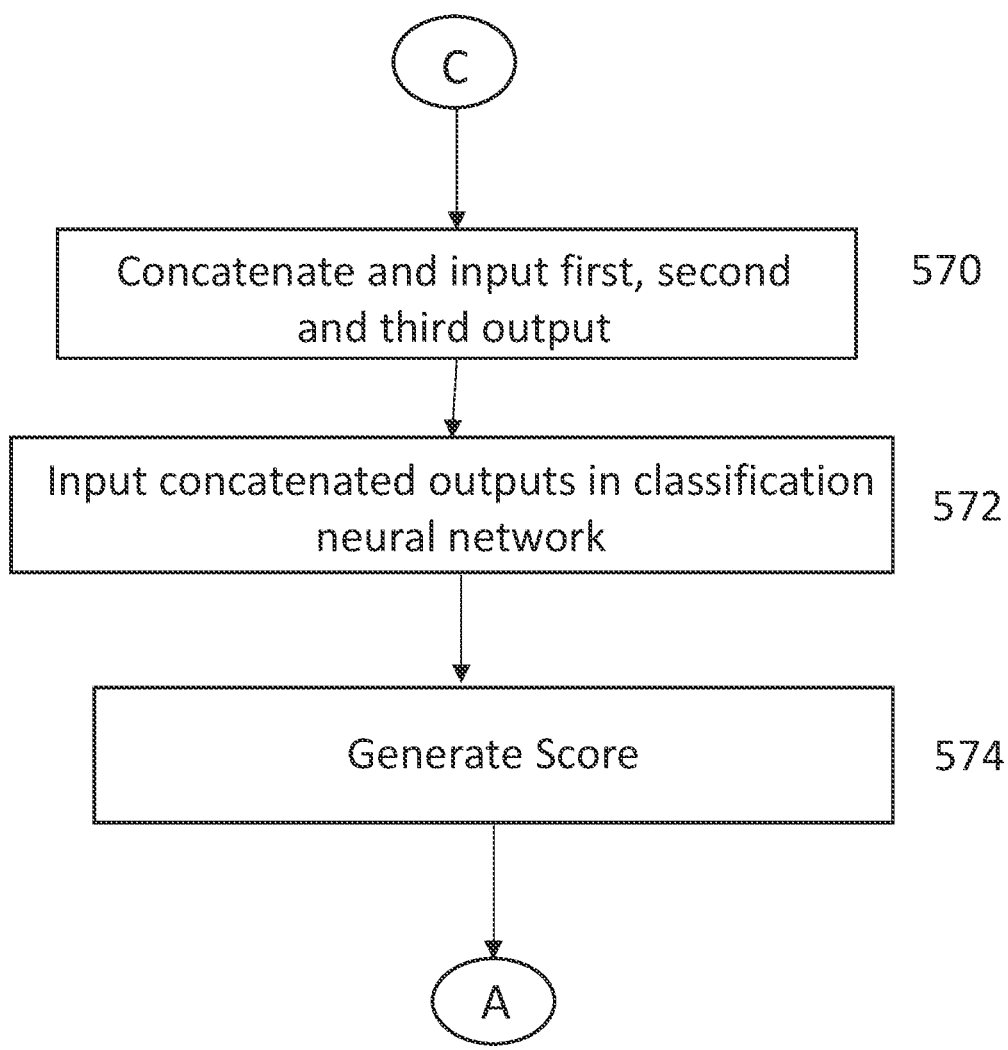

Referring back to operation 540 in FIG. 5A, the image of the signature-in-question and the reference trajectory are compared to each other to determine whether the signature-in-question is authentic. In FIG. 5B, which is a more detailed description of operation 540, comparing the image of the signature-in-question and the reference trajectory may be performed by inputting the image of the signature-in-question in a first neural network during operation 560. As a result, during operation 561, a first output is generated. For example, the first output may be in the form of a vector. During operation 562, the reference trajectory is converted to a reference image, and during operation 563, the reference image is inputted in a second neural network. As a result of the input of the reference image in the second neural network, at operation 564, a second output is generated. For example, the second output is in the form of another vector. The first and second outputs may be two vectors of the same dimensionality. During operation 565, one or more trajectory features of the reference trajectory are inputted in a third neural network, and during operation 566, a third output is generated as a result, the third output being, e.g., a vector of a predetermined dimension. As further described in FIG. 5C, once the first output, second output and third output are generated, during operation 570, the first output, the second output and the third output are concatenated together. During operation 572, the concatenated outputs are inputted into a classification neural network, or into a perceptron, and during operation 574, at least one score is generated, the at least one score representing a degree of confidence that a given pair of signatures belong to the same person.

Figure 5D:
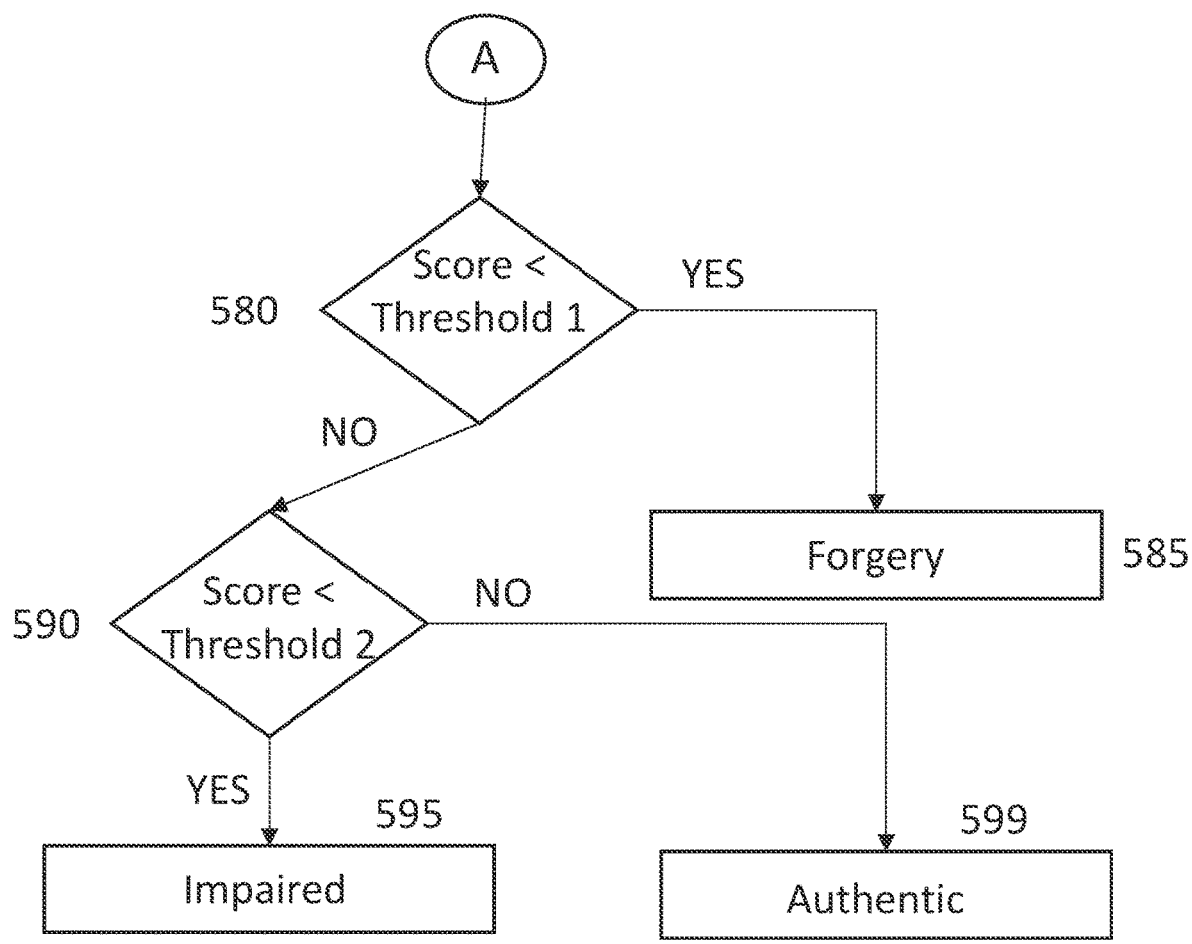

After the score is generating during operation 550, or during operation 574, the score may be indicative of various outcomes such as, e.g., whether the signature-in-question is a forgery, whether the signature-in-question is authentic but the person is impaired at the time of producing the signature, or whether the signature-in-question is authentic and the person is not impaired. For example, as illustrated in FIG. 5D, during operation 580, a determination is made whether the score is below a first threshold. If the score is below the first threshold, then it may be concluded at operation 585 that the signature-in-question is a forgery. In an example, if the score is equal to or above the first threshold, as determined in operation 580, the score may then be compared to a second threshold during operation 590. During operation 590, if the score is lower than a second threshold greater than the first threshold, then it may be determined at operation 595 that although the signature-in-question is authentic, but that the person who produced the signature-in-question is impaired. If the score is equal to or higher than the second threshold, as determined during operation 590, then it may be determined during operation 599 that the signature-in-question is authentic and the person producing the signature-in-question is not impaired. In various aspects, if the score is determined to be inconclusive or too low, then the operations 510-599 may be repeated until a conclusive score may be determined. In various aspects, although the above operations describe comparing the image of the signature-in-question with the reference trajectory, the same operations may apply to comparing the trajectory of the signature-in-question with the reference image.

Figure 6:
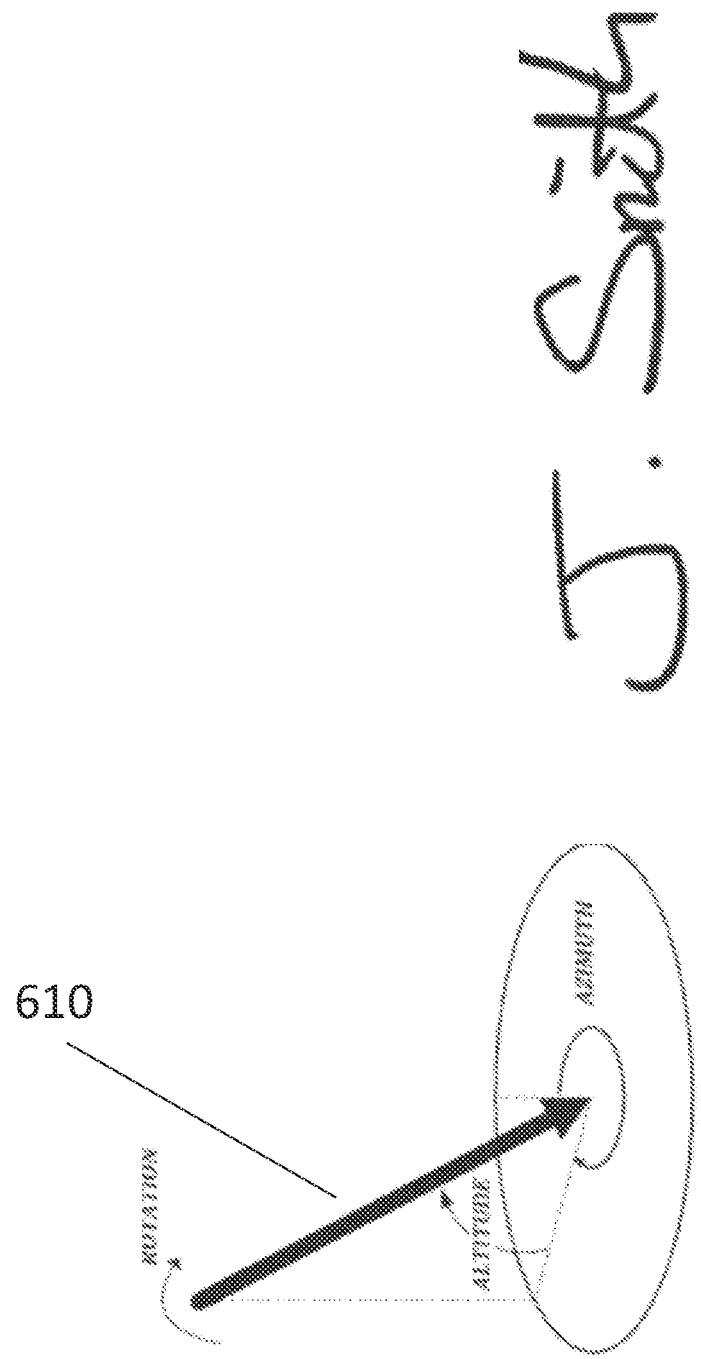
FIG. 6 is an illustration of the effect of the tilt of a writing member on a signature, in accordance with various aspects.

FIG. 6 is an illustration of the effect of the tilt of a writing member on the signature, in accordance with various aspects. In FIG. 6, an illustrative handwritten signature may be detected by a writing member 610, e.g., with a digitizer that allows pen events to be continuously detected when the writing member 610 is lifted from the surface of the digitizer. Accordingly, in the example shown in FIG. 6, rotation, altitude, and azimuth are among the parameters that can be detected for the writing member 610.

Figure 7:
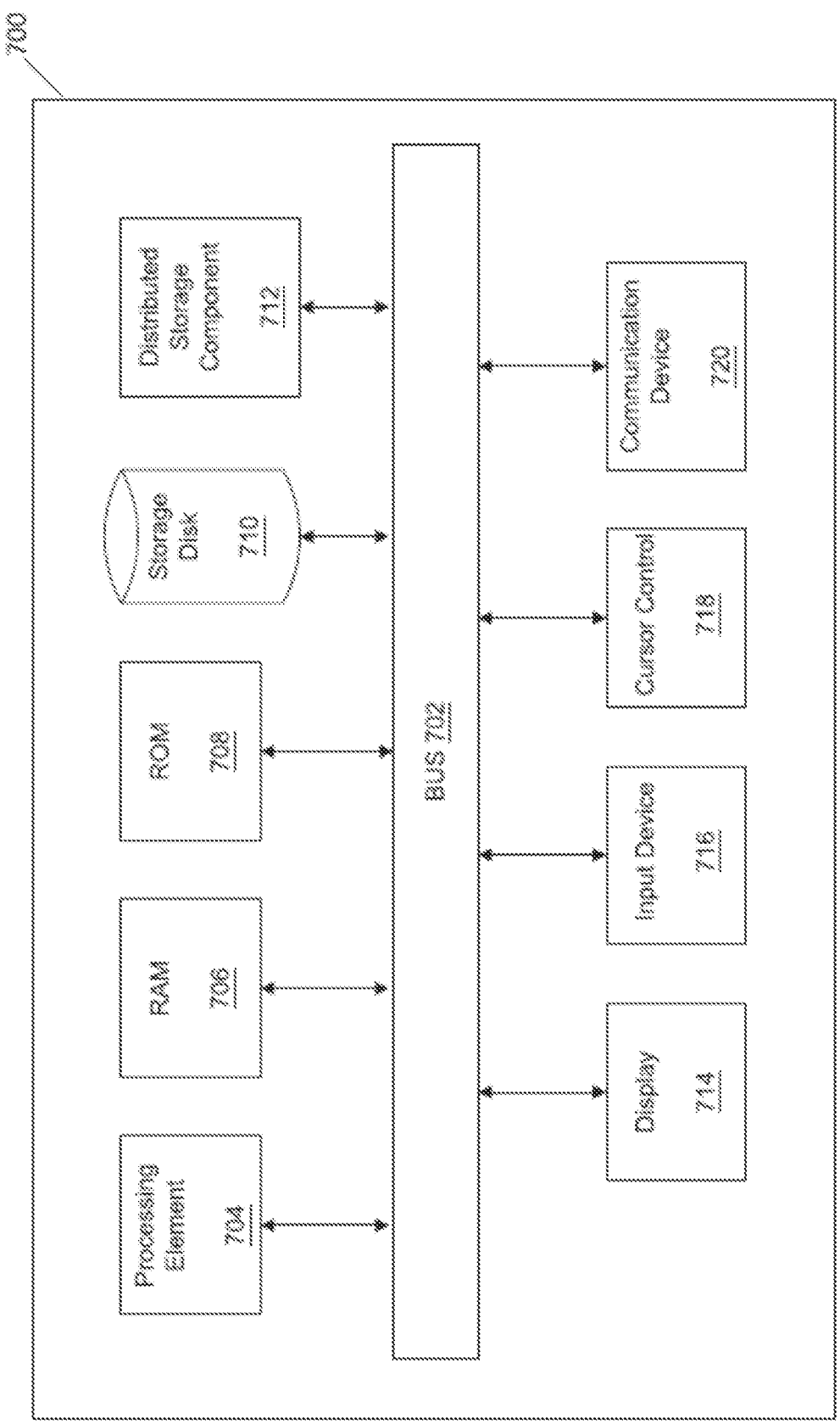
FIG. 7 depicts a block diagram of a computing device.

FIG. 7 depicts a block diagram of a computing device, according to various aspects. In the illustrated example, the computing device 700 may include a bus 702 or other communication mechanism of similar function for communicating information, and at least one processing element 704 (collectively referred to as processing element 704) coupled with bus 702 for processing information. As will be appreciated by those skilled in the art, the processing element 704 may include a plurality of processing elements or cores, which may be packaged as a single processor or in a distributed arrangement. Furthermore, a plurality of virtual processing elements 704 may be included in the computing device 700 to provide the control or management operations for the displays 120 and 160 or the methods 300, 400 and 500 illustrated above.

The computing device 700 may also include one or more volatile memory(ies) 706, which can for example include random access memory(ies) (RAM) or other dynamic memory component(s), coupled to one or more busses 702 for use by the at least one processing element 704. Computing device 700 may further include static, non-volatile memory(ies) 708, such as read only memory (ROM) or other static memory components, coupled to busses 702 for storing information and instructions for use by the at least one processing element 704. A storage component 710, such as a storage disk or storage memory, may be provided for storing information and instructions for use by the at least one processing element 704. As will be appreciated, the computing device 700 may include a distributed storage component 712, such as a networked disk or other storage resource available to the computing device 700.

The computing device 700 may be coupled to one or more displays 714 for displaying information to a user. Optional user input device(s) 716, such as a keyboard and/or touchscreen, may be coupled to Bus 702 for communicating information and command selections to the at least one processing element 704. An optional cursor control or graphical input device 718, such as a mouse, a trackball or cursor direction keys for communicating graphical user interface information and command selections to the at least one processing element. The computing device 700 may further include an input/output (I/O) component, such as a serial connection, digital connection, network connection, or other input/output component for allowing intercommunication with other computing components and the various components of the displays 120 and 160 or the methods 300, 400 and 500 illustrated above.

In various embodiments, computing device 700 can be connected to one or more other computer systems via a network to form a networked system. Such networks can for example include one or more private networks or public networks, such as the Internet. In the networked system, one or more computer systems can store and serve the data to other computer systems. The one or more computer systems that store and serve the data can be referred to as servers or the cloud in a cloud computing scenario. The one or more computer systems can include one or more web servers, for example. The other computer systems that send and receive data to and from the servers or the cloud can be referred to as client or cloud devices, for example. Various operations of the displays 120 and 160 or the methods 300, 400 and 500 illustrated above may be supported by operation of the distributed computing systems.

The computing device 700 may be operative to control operation of the components of the displays 120 and 160 or the methods 300, 400 and 500 illustrated above through a communication device such as, e.g., communication device 720, and to handle data provided from the data sources as discussed above with respect to the displays 120 and 160 or the methods 300, 400 and 500. In some examples, analysis results are provided by the computing device 700 in response to the at least one processing element 704 executing instructions contained in memory 706 or 708 and performing operations on the received data items. Execution of instructions contained in memory 706 and/or 708 by the at least one processing element 704 can render the displays 120 and 160 or the methods 300, 400 and 500 operative to perform methods described herein.

The term "computer-readable medium" as used herein refers to any media that participates in providing instructions to the processing element 704 for execution. Such a medium may take many forms, including but not limited to, non-volatile media, volatile media, and transmission media. Non-volatile media includes, for example, optical or magnetic disks, such as disk storage 710. Volatile media includes dynamic memory, such as memory 706. Transmission media includes coaxial cables, copper wire, and fiber optics, including the wires that include bus 702.

Common forms of computer-readable media or computer program products include, for example, a floppy disk, a flexible disk, hard disk, magnetic tape, or any other magnetic medium, a CD-ROM, digital video disc (DVD), a Blu-ray Disc, any other optical medium, a thumb drive, a memory card, a RAM, PROM, and EPROM, a FLASH-EPROM, any other memory chip or cartridge, or any other tangible medium from which a computer can read.

Various forms of computer readable media may be involved in carrying one or more sequences of one or more instructions to the processing element 704 for execution. For example, the instructions may initially be carried on the magnetic disk of a remote computer. The remote computer can load the instructions into its dynamic memory and send the instructions over a telephone line using a modem. A modem local to computing device 700 can receive the data on the telephone line and use an infra-red transmitter to convert the data to an infra-red signal. An infra-red detector coupled to bus 702 can receive the data carried in the infra-red signal and place the data on bus 702. Bus 702 carries the data to memory 706, from which the processing element 704 retrieves and executes the instructions. The instructions received by memory 706 and/or memory 708 may optionally be stored on storage device 710 either before or after execution by the processing element 704.

In accordance with various embodiments, instructions operative to be executed by a processing element to perform a method are stored on a computer-readable medium. The computer-readable medium can be a device that stores digital information. For example, a computer-readable medium includes a compact disc read-only memory (CD-ROM) as is known in the art for storing software. The computer-readable medium is accessed by a processor suitable for executing instructions configured to be executed.

This disclosure described some examples of the present technology with reference to the accompanying drawings, in which only some of the possible examples were shown. Other aspects can, however, be embodied in many different forms and should not be construed as limited to the examples set forth herein. Rather, these examples were provided so that this disclosure was thorough and complete and fully conveyed the scope of the possible examples to those skilled in the art.

Although specific examples were described herein, the scope of the technology is not limited to those specific examples. One skilled in the art will recognize other examples or improvements that are within the scope of the present technology. Therefore, the specific structure, acts, or media are disclosed only as illustrative examples. Examples according to the technology may also combine elements or components of those that are disclosed in general but not expressly exemplified in combination, unless otherwise stated herein. The scope of the technology is defined by the following claims and any equivalents therein.

What is claimed is:

1. A method of signature verification, the method comprising:
    receiving a signature-in-question;
    extracting at least one of an image of the signature-in-question and a trajectory of the signature-in-question from the received signature-in-question;
    accessing a reference signature from a reference signature storage, the reference signature storage including at least one of a reference image and a reference trajectory;
    extracting at least one of the reference image and the reference trajectory from the accessed reference signature storage; and
    comparing the at least one of the image of the signature-in-question and trajectory of the signature-in-question to the at least one of the reference image and reference trajectory to determine whether the signature-in-question is authentic;
    wherein the image of the signature-in-question is received with the signature-in-question; and
    wherein comparing the image of the signature-in-question to the reference trajectory comprises:
        inputting the image of the signature-in-question in a first neural network and generating a first output;
        converting the reference trajectory to a reference image and inputting the reference image in a second neural network to generate a second output;
        inputting the reference trajectory in a third neural network and generating a third output;
        concatenating the first output, the second output and the third output;
        inputting the concatenated first, second and third outputs into a classification neural network; and
        generating at least one score.

2. The method of claim 1, further comprising determining whether the signature-in-question is authentic based on the comparison.

3. The method of claim 1, wherein at least one of a signing velocity, a signing acceleration, a signing pressure, and a signature time of the signature-in-question and the reference signature are derived from at least one of the trajectory of the signature-in-question and the reference trajectory.

4. The method of claim 1, wherein the receiving of the signature-in-question comprises at least one of capturing the signature-in-question on a signing device, receiving a photograph of the signature-in-question, receiving a scan of the signature-in-question, receiving a drawing as the signature-in-question, and receiving a word or a password as the signature-in-question.

5. The method of claim 4, wherein the accessing the reference signature storage comprises accessing the reference signature storage from the signing device.

6. The method of claim 1, wherein the accessing the reference signature storage of the reference signature comprises accessing at least one of a scan of an identity document, a photograph of the identity document, a scan of the reference signature, a photograph of the reference signature, a drawing as the reference signature, and a word or password as the reference signature.

7. The method of claim 1, wherein the accessing the reference signature storage comprises accessing the reference signature storage from one of a data repository, a memory or magnetic strip of an identification document, and a memory or magnetic strip of a magnetic card.

8. The method of claim 1, wherein:
the extracted reference trajectory is converted to the reference image; and
the image of the signature-in-question and the reference image are compared to determine whether the signature-in-question is authentic.

9. The method of claim 1, wherein:
the trajectory of the signature-in-question is received with the signature-in-question; and
the trajectory of the signature-in-question and the reference image are compared to determine whether the signature-in-question is authentic.

10. The method of claim 9, wherein the trajectory of the signature-in-question and the reference image are compared without converting the trajectory of the signature-in-question to an image thereof.

11. The method of claim 9, wherein the reference image is extracted from an identity document image.

12. A method of signature verification, the method comprising:
receiving a signature-in-question;
extracting at least one of an image of the signature-in-question and a trajectory of the signature-in-question from the received signature-in-question;
accessing a reference signature from a reference signature storage, the reference signature storage including at least one of a reference image and a reference trajectory;
extracting at least one of the reference image and the reference trajectory from the accessed reference signature storage; and
comparing the at least one of the image of the signature-in-question and trajectory of the signature-in-question to the at least one of the reference image and reference trajectory; wherein:
the trajectory of the signature-in-question is received with the signature-in-question;
the trajectory of the signature-in-question is converted to the image of the signature-in-question; and
the image of the signature-in-question and the reference image are compared to determine whether the signature-in-question is authentic.

13. A method of signature verification, the method comprising:
receiving a signature-in-question;
extracting at least one of an image of the signature-in-question and a trajectory of the signature-in-question from the received signature-in-question;
accessing a reference signature from a reference signature storage, the reference signature storage including at least one of a reference image and a reference trajectory;
extracting at least one of the reference image and the reference trajectory from the accessed reference signature storage; and
comparing the at least one of the image of the signature-in-question and trajectory of the signature-in-question to the at least one of the reference image and reference trajectory; wherein:
the image of the signature-in-question is received with the signature-in-question;
the image of the signature-in-question is converted to the trajectory of the signature-in-question; and
the trajectory of the signature-in-question and the reference trajectory are compared to determine whether the signature-in-question is authentic.

14. A method of signature verification, the method comprising:
receiving a signature-in-question;
extracting at least one of an image of the signature-in-question and a trajectory of the signature-in-question from the received signature-in-question;
accessing a reference signature from a reference signature storage, the reference signature storage including at least one of a reference image and a reference trajectory;
extracting at least one of the reference image and the reference trajectory from the accessed reference signature storage; and
comparing the at least one of the image of the signature-in-question and trajectory of the signature-in-question to the at least one of the reference image and reference trajectory;
wherein the image of the signature-in-question is received with the signature-in-question; and wherein comparing the image of the signature-in-question and the reference trajectory comprises:
inputting the image of the signature-in-question in a first neural network and generating a first output;
inputting the reference trajectory in a second neural network and generating a second output; and
inputting the first output and the second output in a third neural network and generating at least one score.

15. A method of signature verification, the method comprising:
receiving a signature-in-question;
extracting at least one of an image of the signature-in-question and a trajectory of the signature-in-question from the received signature-in-question;
accessing a reference signature from a reference signature storage, the reference signature storage including at least one of a reference image and a reference trajectory;
extracting at least one of the reference image and the reference trajectory from the accessed reference signature storage; and
comparing the at least one of the image of the signature-in-question and trajectory of the signature-in-question to the at least one of the reference image and reference trajectory; wherein:
the reference image is extracted from an identity document image;
the trajectory of the signature-in-question is received with the signature-in-question; and
the trajectory of the signature-in-question and the reference image are compared to determine whether the signature-in-question is authentic; and
wherein comparing the trajectory of the signature-in-question and the reference image comprises:
inputting the trajectory of the signature-in-question in a first neural network and generating a first output;

inputting the reference image in a second neural network and generating a second output;
inputting the trajectory of the signature-in-question in a third neural network and generating a third output;
concatenating the first output, the second output and the third output;
inputting the concatenated first, second and third output into a classification neural network; and
generating at least one score.

16. A method of signature verification, the method comprising:
receiving a signature-in-question;
extracting at least one of an image of the signature-in-question and a trajectory of the signature-in-question from the received signature-in-question;
accessing a reference signature from a reference signature storage, the reference signature storage including at least one of a reference image and a reference trajectory;
extracting at least one of the reference image and the reference trajectory from the accessed reference signature storage; and
comparing the at least one of the image of the signature-in-question and trajectory of the signature-in-question to the at least one of the reference image and reference trajectory; wherein:
the reference image is extracted from an identity document image;
the trajectory of the signature-in-question is received with the signature-in-question; and
the trajectory of the signature-in-question and the reference image are compared to determine whether the signature-in-question is authentic; and
wherein comparing the trajectory of the signature-in-question and the reference image comprises:
inputting the trajectory of the signature-in-question in a first neural network and generating a first output;
inputting the reference image in a second neural network and generating a second output; and
inputting the first output and the second output in a third neural network and generating at least one score.

17. A signature verification system comprising:
a data receiver;
an updatable data repository functionally coupled to the data receiver;
a display device functionally coupled to the data receiver;
a processor operatively coupled to the data receiver, to the updatable data repository and to the display device; and
a memory coupled to the processor, the memory storing instructions that, when executed by the processor, perform a set of operations comprising:
receiving, at the data receiver, a signature-in-question;
extracting, via the processor, at least one of an image of the signature-in-question and a trajectory of the signature-in-question from the received signature-in-question;
accessing a reference signature storage of a reference signature, the reference signature storage including at least one of a reference image and a reference trajectory;
extracting, via the processor, at least one of the reference image and the reference trajectory from the accessed reference signature storage; and
comparing, via the processor, the at least one of the image of the signature-in-question and trajectory of the signature-in-question to the at least one of the reference image and reference trajectory to determine whether the signature-in-question is authentic;
wherein the image of the signature-in-question is received with the signature-in-question; and
wherein the set of operations comprises comparing the image of the signature-in-question to the reference trajectory by:
inputting the image of the signature-in-question in a first neural network and generating a first output;
converting the reference trajectory to a reference image and inputting the reference image in a second neural network to generate a second output;
inputting the reference trajectory in a third neural network and generating a third output;
concatenating the first output, the second output and the third output;
inputting the concatenated first, second and third outputs into a classification neural network; and
generating at least one score.

18. The system of claim 17, wherein the set of operations further comprise determining whether the signature-in-question is authentic based on the comparison.

19. The system of claim 17, wherein the trajectory of the signature-in-question and the reference trajectory respectively comprise trajectory features including at least one of a sequence of coordinates representing locations of a writing member, a time stamp corresponding to each location, a pressure applied by the writing member, and a tilt of the writing member.

20. The system of claim 19, wherein the writing member is one of a stylus, a pen, and a finger of a signing person.

21. The system of claim 17, the signature-in-question is at least one of captured on a signing device, received as a photograph thereof, and received as a scan thereof.

22. The system of claim 17, wherein the signature-in-question is received at a kiosk, the kiosk including at least one of a video camera, a photo camera, a scanner, and a signature pad.

23. The system of claim 17, wherein the reference signature is accessed via at least one of a scan of an identity document, a photograph of the identity document, a scan of the reference signature, a photograph of the reference signature, a drawing as the reference signature, and a word or password as the reference signature.

24. The system of claim 17, wherein:
the trajectory of the signature-in-question is received with the signature-in-question; and
the set of operations comprises comparing the trajectory of the signature-in-question and the reference image to determine whether the signature-in-question is authentic.

25. The system of claim 24, wherein the set of operations comprises comparing the trajectory of the signature-in-question and the reference image without converting the trajectory of the signature-in-question to an image thereof.

26. The system of claim 24, wherein the set of operations comprise extracting the reference image from an identity document image.

27. A signature verification system comprising:
a data receiver;
an updatable data repository functionally coupled to the data receiver;
a display device functionally coupled to the data receiver;
a processor operatively coupled to the data receiver, to the updatable data repository and to the display device; and a memory coupled to the processor, the memory storing instructions that, when executed by the processor, perform a set of operations comprising:
    receiving, at the data receiver, a signature-in-question;
    extracting, via the processor, at least one of an image of the signature-in-question and a trajectory of the signature-in-question from the received signature-in-question;
    accessing a reference signature storage of a reference signature, the reference signature storage including at least one of a reference image and a reference trajectory;
    extracting, via the processor, at least one of the reference image and the reference trajectory from the accessed reference signature storage; and
    comparing, via the processor, the at least one of the image of the signature-in-question and trajectory of the signature-in-question to the at least one of the reference image and reference trajectory; wherein:
    the image of the signature-in-question is received with the signature-in-question;
    the extracted reference trajectory is converted to the reference image; and
    the set of operations comprises comparing the image of the signature-in-question and the reference image to determine whether the signature-in-question is authentic.

28. A signature verification system comprising:
a data receiver;
an updatable data repository functionally coupled to the data receiver;
a display device functionally coupled to the data receiver;
a processor operatively coupled to the data receiver, to the updatable data repository and to the display device; and
a memory coupled to the processor, the memory storing instructions that, when executed by the processor, perform a set of operations comprising:
    receiving, at the data receiver, a signature-in-question;
    extracting, via the processor, at least one of an image of the signature-in-question and a trajectory of the signature-in-question from the received signature-in-question;
    accessing a reference signature storage of a reference signature, the reference signature storage including at least one of a reference image and a reference trajectory;
    extracting, via the processor, at least one of the reference image and the reference trajectory from the accessed reference signature storage; and
    comparing, via the processor, the at least one of the image of the signature-in-question and trajectory of the signature-in-question to the at least one of the reference image and reference trajectory; wherein:
    the trajectory of the signature-in-question is received with the signature-in-question;
    the trajectory of the signature-in-question is converted to the image of the signature-in-question; and
    the set of operations comprises comparing the image of the signature-in-question and the reference image to determine whether the signature-in-question is authentic.

\* \* \* \* \*